US012701405B2

(12) United States Patent (10) Patent No.: US 12,701,405 B2
Ren et al. (45) Date of Patent: Aug. 4, 2026

(54) USER EQUIPMENT CAPABILITY NUMBER DEFINED IN MACHINE LEARNING LIMIT

(71) Applicant: QUALCOMM Incorporated, San Diego, CA (US)

(72) Inventors: Yuwei Ren, Beijing (CN); June Namgoong, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/694,329

(22) PCT Filed: Nov. 24, 2021

(86) PCT No.: PCT/CN2021/132710
§ 371 (c)(1),
(2) Date: Mar. 21, 2024

(87) PCT Pub. No.: WO2023/092321
PCT Pub. Date: Jun. 1, 2023

(65) Prior Publication Data
US 2025/0247690 A1 Jul. 31, 2025

(51) Int. Cl.
*H04W 8/24* (2009.01)
*H04W 24/02* (2009.01)

(52) U.S. Cl.
CPC ............. *H04W 8/24* (2013.01); *H04W 24/02* (2013.01)

(58) Field of Classification Search
CPC ................................. H04W 8/24; H04W 24/02
See application file for complete search history.

(56) References Cited

U.S. PATENT DOCUMENTS

| | | | |
|---|---|---|---|
| 2016/0222353 A1* | 8/2016 | Yang .......................... | A61P 1/16 |
| 2021/0185515 A1 | 6/2021 | Bao et al. | |
| 2021/0345134 A1 | 11/2021 | Ottersten et al. | |
| 2022/0279364 A1* | 9/2022 | Koral .................... | H04W 48/02 |
| 2024/0398789 A1* | 12/2024 | Xue ..................... | A61K 31/216 |
| 2025/0234218 A1* | 7/2025 | Soldati .............. | H04W 28/0278 |

FOREIGN PATENT DOCUMENTS

| | | |
|---|---|---|
| CN | 113570062 A | 10/2021 |
| WO | 2021048600 A1 | 3/2021 |
| WO | 2021170617 A1 | 9/2021 |

OTHER PUBLICATIONS

International Search Report and Written Opinion—PCT/CN2021/132710—ISA/EPO—Aug. 23, 2022.
Zte, et al., "Machine Learning Assisted Load Prediction", R3-206721, 3GPP TSG-RAN WG3 Meeting #110e, Nov. 2, 2020-Nov. 12, 2020, 5 Pages, Nov. 12, 2020, the whole document.

* cited by examiner

*Primary Examiner* — Syed Ali

(74) *Attorney, Agent, or Firm* — Patterson + Sheridan, L.L.P.

(57) ABSTRACT

Certain aspects of the present disclosure provide techniques for a method for wireless communications by a user equipment (UE), comprising generating a message that includes a first parameter indicating a capability of the UE to support machine learning (ML) functions across a group of cells and transmitting the message to a network entity.

23 Claims, 11 Drawing Sheets

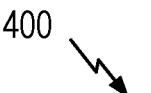
400
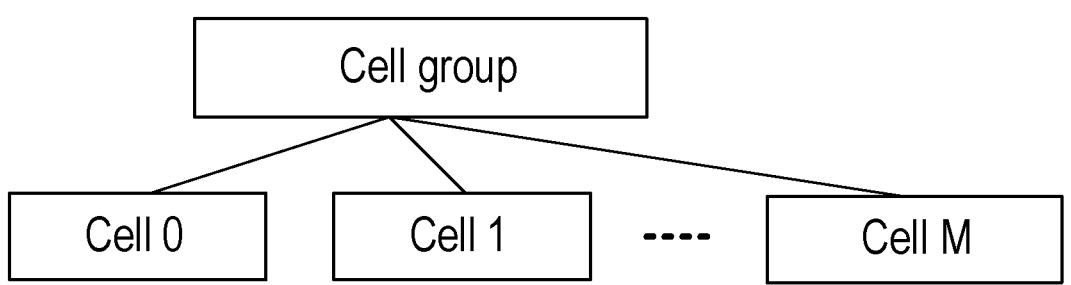
*FIG. 4*

500

UE

NW

502

Determine an overall
ML capability number
$N_{CG}$ across **_all cells
from one cell group_**

504

$N_{CG}$

506

Determine an actual
ML capability number
$M_{CG}$ per cell group
based on $N_{CG}$

508

$M_{CG}$

600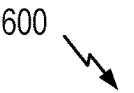

UE

NW

602

Determine an overall ML capability number $N_{CGg}$ across __all cells__ from a cell group __g__, where ML capability of the UE is split across cells in the group of cells Determine a limit $L_{SC,T}$ of the UE to support ML functions __within a single cell__

604

606

$N_{CGg} + L_{SC,T}$

607

Determine actual ML capability number $M_{CGg}$ for cell group g based on $N_{CGg}$

608

Split $M_{CGg}$ across cells, such that actual number of computational complexity or memory usage for each cell is $\leq L_{SC,T}$

*FIG. 6*

700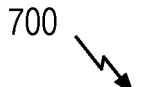
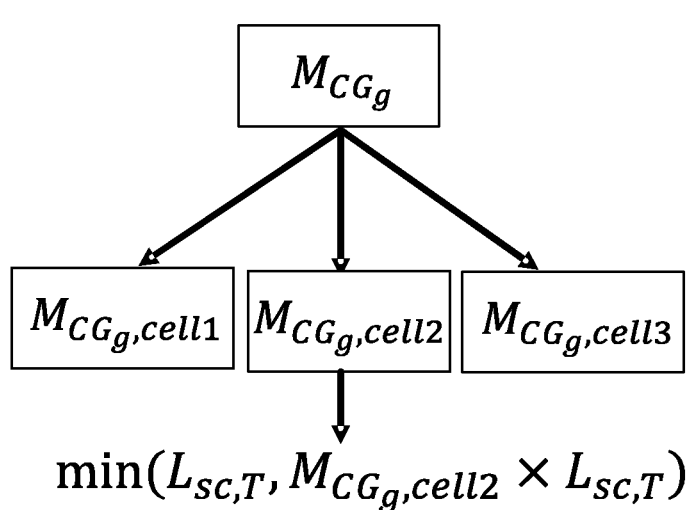
*FIG. 7*

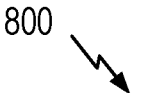
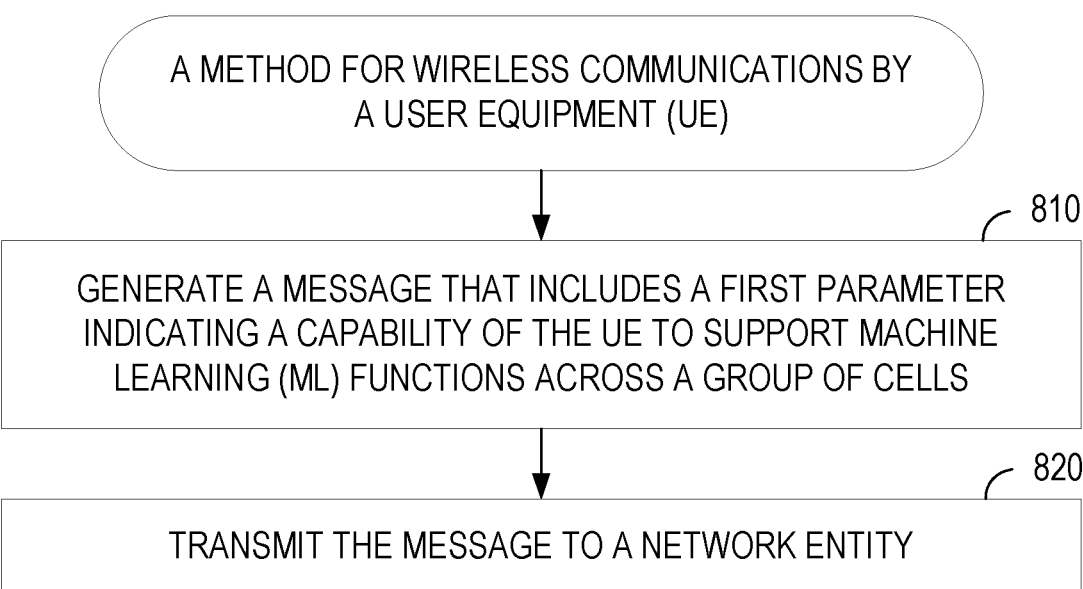
A METHOD FOR WIRELESS COMMUNICATIONS BY
A USER EQUIPMENT (UE)
810
GENERATE A MESSAGE THAT INCLUDES A FIRST PARAMETER
INDICATING A CAPABILITY OF THE UE TO SUPPORT MACHINE
LEARNING (ML) FUNCTIONS ACROSS A GROUP OF CELLS
820
TRANSMIT THE MESSAGE TO A NETWORK ENTITY
*FIG. 8*

900

A METHOD FOR WIRELESS COMMUNICATIONS
BY A NETWORK ENTITY

910

RECEIVE, FROM A USER EQUIPMENT (UE), A MESSAGE THAT
INCLUDES A FIRST PARAMETER INDICATING A ML CAPABILITY OF THE
UE TO SUPPORT MACHINE LEARNING (ML) FUNCTIONS ACROSS A
GROUP OF CELLS

920

CONTROL ML COMPUTATIONAL COMPLEXITY OR MEMORY USAGE
ACROSS A TOTAL NUMBER OF CELLS BASED ON THE FIRST
PARAMETER

1000

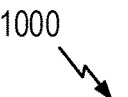

1010

1008

Transceiver

1002

Processing System

1006

1020

Processor(s)

1030

Computer-Readable Medium/Memory

1021

Circuitry for generating a message that includes a first parameter indicating a capability of the UE to support machine learning (ML) functions across a group of cells

1031

Code for generating a message that includes a first parameter indicating a capability of the UE to support machine learning (ML) functions across a group of cells

1022

Circuitry for transmitting the message to a network entity

1032

Code for transmitting the message to a network entity

1110

1108

Transceiver

1102

Processing System

1106

1120

1130

Processor(s)

Computer-Readable
Medium/Memory

1121

1131

Circuitry for receiving, from a
user equipment (UE), a message
that includes a first parameter
indicating a ML capability of the
UE to support machine learning
(ML) functions across a group of
cells Code for receiving, from a user
equipment (UE), a message that
includes a first parameter
indicating a ML capability of the
UE to support machine learning
(ML) functions across a group of
cells

1122

1132

Circuitry for controlling ML
computational complexity or
memory usage across a total
number of cells based on the first
parameter Code for controlling ML
computational complexity or
memory usage across a total
number of cells based on the first
parameter

*FIG. 11*

USER EQUIPMENT CAPABILITY NUMBER DEFINED IN MACHINE LEARNING LIMIT

CROSS-REFERENCE TO RELATED APPLICATIONS

This application is a national stage application under 35 U.S.C. 371 of PCT/CN2021/132710, filed Nov. 24, 2021, which is hereby expressly incorporated by reference herein in its entirety as if fully set forth below and for all applicable purposes.

INTRODUCTION

Aspects of the present disclosure relate to wireless communications, and more particularly, to techniques for defining user equipment (UE) capability for machine learning (ML) support across a wireless network cell group.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communication networks to overcome various challenges.

SUMMARY

One aspect provides a method for wireless communications by a user equipment (UE). The method may include generating a message that includes a first parameter indicating a capability of the UE to support machine learning (ML) functions across a group of cells. The method may include transmitting the message to a network entity.

One aspect provides a method for wireless communications by a network entity. The method may include receiving, from a UE, a message that includes a first parameter indicating a ML capability of the UE to support ML functions across a group of cells. The method may include controlling ML computational complexity or memory usage across a total number of cells based on the first parameter.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein;

a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 4 depicts an example cell grouping for a wireless network.

FIG. 6 depicts a second example call flow diagram for a UE to signal information regarding its capability to process ML functions across a group of cells including a per cell limit.

FIG. 7 is an example of how a UE ML capability may be split among cells in a cell group.

FIG. 8 illustrates example operations for wireless communications by a UE, in accordance with some aspects of the present disclosure.

FIG. 10 depicts aspects of an example communications device.

FIG. 11 depicts aspects of an example communications device.

DETAILED DESCRIPTION

Aspects of the present disclosure provide apparatuses, methods, processing systems, and computer-readable mediums for indicating capability of a user equipment (UE) capability to support machine learning (ML) across a network cell group.

In 5G new radio (NR), a UE may report its capability for performing a variety of functions and/or to support a variety of features. The UE may indicate its capability in a capability report message, for example, sent in response to a capability inquiry from a base station.

For machine learning (ML) functions, ML computational complexity and memory are critical for ML implementation on UE, and may determine, in part, a UE ML capability. Diverse ML models may be configured to support different functions or different cells. The capability of the UE may be limited in terms of computational complexity (e.g., a number of multiplication operations in a given ML function) and memory (e.g., a number of neurons or number of model parameters for a given ML function). When the UE supports ML functions across multiple cells, there is a risk the cumulative computational complexity and/or memory requirements of the ML models across all cells exceeds the ML capability of the UE.

Aspects of the present disclosure, however, may mitigate this risk, by providing a mechanism where the UE signals its capability to support ML functions (e.g., as part of its reported capability information). Such information may provide an indication of overall computation complexity and memory usage supported by the UE across all cells, as well as a limit per-cell. The network may use this information to help ensure control ML computational complexity and memory usage across a cell group, as well as per-cell limits, do not exceed the reported UE capability.

In some cases, to limit signaling overhead (e.g., the number of bits added to an existing UE capability report or sent in a new UE capability report), the UE ML capability across all cells in a group may be efficiently reported as a number.

Introduction to Wireless Communication Networks

Figure 1:
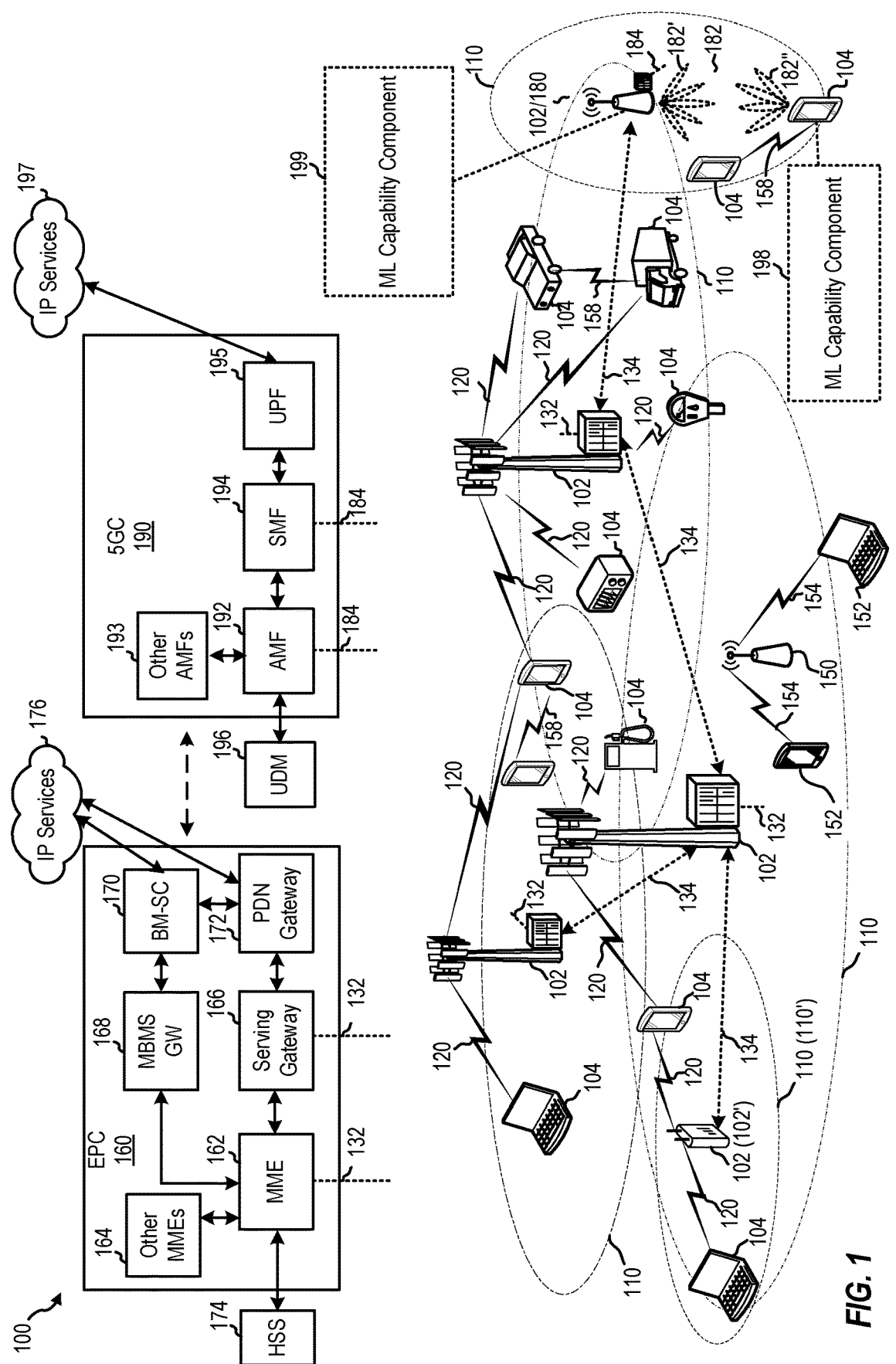
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes machine learning (ML) capability component 199, which may be configured to control ML complexity and/or memory usage across a cell group. Wireless network 100 further includes ML capability component 198, which may be used configured to determine ML capability across a cell group.

Figure 2:
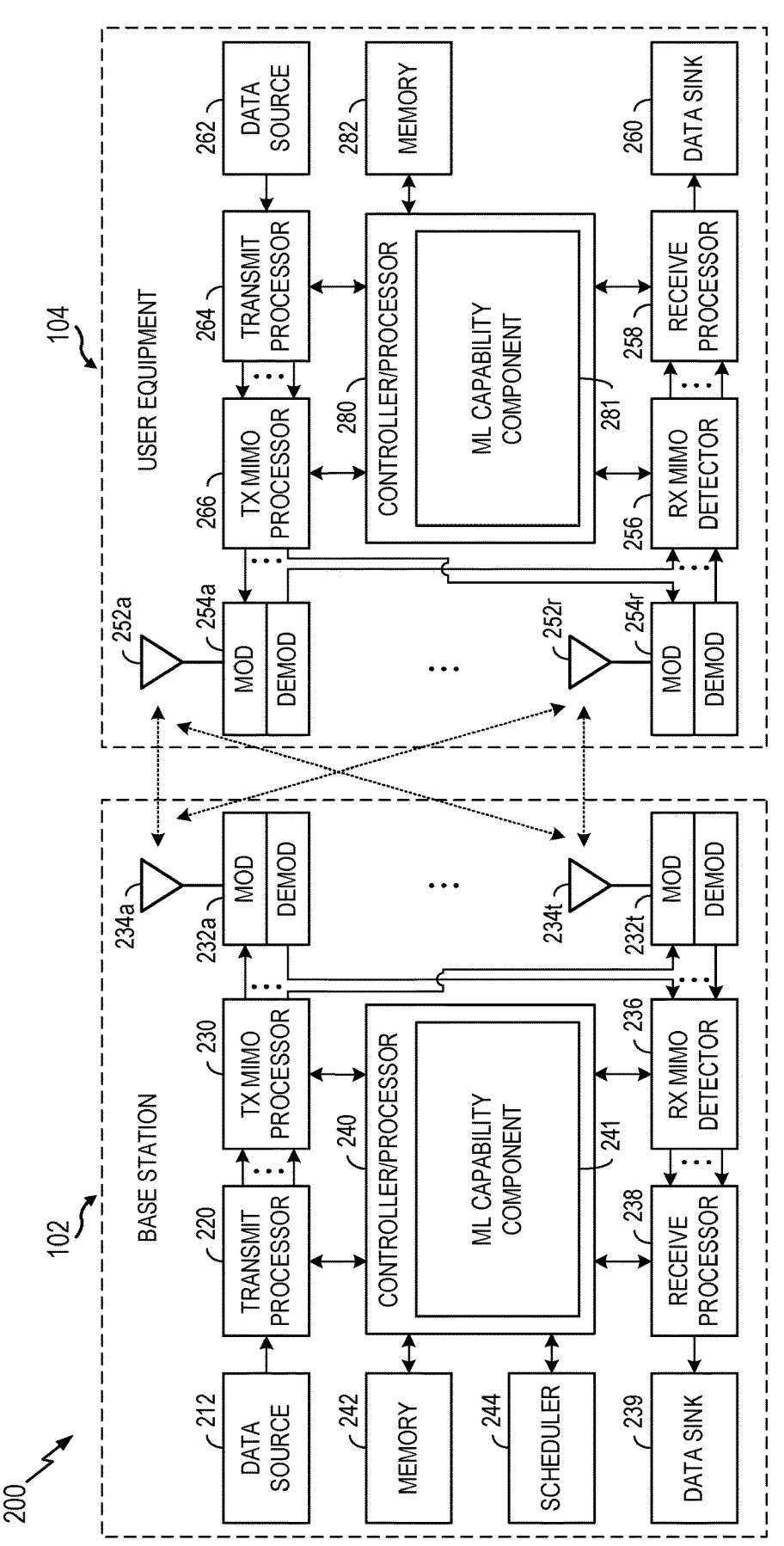
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes ML capability component 241, which may be representative of ML capability component 199 of FIG. 1. Notably, while depicted as an aspect of controller/processor 240, ML capability component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes ML capability component 281, which may be representative of ML capability component 198 of FIG. 1. Notably, while depicted as an aspect of controller/processor 280, ML capability component 281 may be implemented additionally or alternatively in various other aspects of user equipment 104 in other implementations.

Figures 3A, 3B, 3C, 3D:
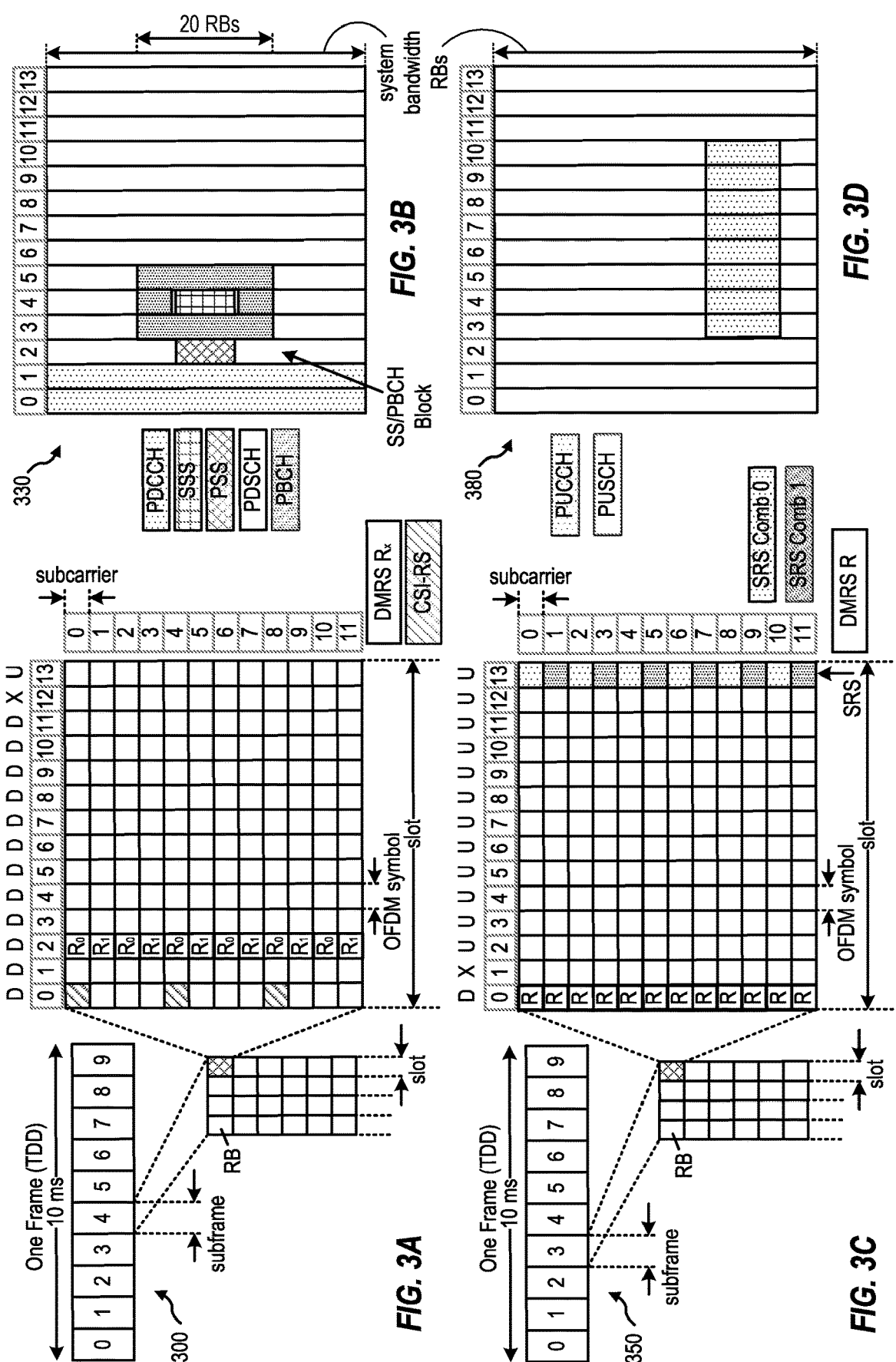
FIG. 3A, FIG. 3B, FIG. 3C, and FIG. 3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example UE Capability Signaling

UE radio capability information may include information regarding RATs supported by the UE. Such information can include, but is not limited to, power class, frequency bands, duplexing mode, traffic profile (e.g., voice centric, data centric, etc.), radio bearers, etc., supported by the UE. In general, the UE may report its UE radio access capabilities (which may be static) when requested by the network.

For example, a BS (e.g., the BS 102 of FIG. 1) may send a UE Capability Enquiry message to a UE (e.g., the UE 104 of FIG. 1). In response, the UE may send a UE Capability Information message to the BS. In some cases, the BS can request what capabilities for the UE to report (e.g., similar to band and band combination requests in LTE). In some cases, the size of the UE Capability Information message can be significantly large (e.g., greater than 50 octets) for some communication networks (e.g., LTE, NR). Sending UE capability information of such a large size can reduce network throughput and efficiency of network communications.

In addition, there may be some situations in which the UE participates in multiple procedures to inform the network of its UE radio capabilities. For example, in some cases, the UE may change some of its UE radio capabilities. The change of UE radio capabilities may be to, temporarily (e.g., under network control), limit the availability of some capabilities, e.g., due to hardware sharing, interference or overheating. The temporary capability restriction may be transparent to the core network (e.g., NextGen (5G) Core). That is, the core network may just store the UE's static capabilities. The UE may signal the temporary capability restriction request to the BS. As the UE changes its UE radio capabilities, it may participate in additional procedures to inform the network. This can lead to repeated signaling of the UE Capability Information message, which can reduce network throughput.

Compared to LTE, UEs in 5G NR systems may support different and/or additional capabilities. As a result, the size of the UE capability information message is further expected to significantly increase in size (e.g., relative to LTE). Thus, it may be desirable to reduce the size of the UE capability signaling, due in part, to the significant size of the UE radio capability information.

Aspects Related to Defining UE Capability for ML Support Across a Cell Group Aspects of the present disclosure provide apparatuses, methods, processing systems, and computer-readable mediums for indicating capability of a user equipment (UE) capability to support machine learning (ML) across a network cell group.

As noted above, ML computational complexity and memory are critical for ML implementation on UE, and may determine the UEs ability to support diverse ML models and functions on different cells. By reporting UE ML capability, aspects of the present disclosure may mitigate the risk that the cumulative computational complexity and/or memory requirements of the various ML models and functions configured across all cells exceeds the ML capability of the UE.

In some cases, to limit signaling overhead (e.g., the number of bits added to an existing UE capability report or sent in a new UE capability report), the UE ML capability across all cells in a group may be efficiently reported as a number.

When a UE accesses multiple cells, the ML capability reporting proposed herein may help ensure that the overall configured ML models do not exceed the ML capability limit at the UE. For example, based on carrier aggregation in one cell group, a UE may support the ML functions separately configured by each cell (e.g., a primary cell (PCell) and/or secondary cell (SCell)).

According to certain aspects of the present disclosure, a UE may determine ML limit configuration in a cell group. The UE capability may be reported as an overall ML capability number $N_{CG}$ across all cells in a cell group.

As illustrated in FIG. 4, a cell group may contain any number of cells from Cell 0 to Cell M. A UE may define the counting rules of the limit of ML functions supported in the cell group of FIG. 4. The reported ML capability may account for cells with a mixed numerology and a per-cell limit. The UE may also implement dropping rules to satisfy the ML capability. Based at least in part on the counting rules, the UE may send a ML capability report to the network.

Figure 5:
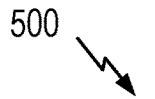
FIG. 5 depicts a first example call flow diagram for a UE to signal information regarding its capability to process machine learning (ML) functions across a group of cells.

UE ML capability reporting proposed herein may be described with reference to the call flow diagram 500 of FIG. 5. As illustrated, at 502, a UE determines an overall ML capability number (i.e., $N_{CG}$) across all cells from a cell group. At 504, the UE transmits $N_{CG}$ to a network entity (e.g., a gNB). The ML capability may be signaled via an existing ML capability report message (e.g., adding an additional information element or fields) or via a newly defined ML capability report message.

In some cases, the network determines an actual ML capability number MCG based on $N_{CG}$ at 506, and transmits an indication of $M_{CG}$ to the UE at 508. As will be described in greater detail below, $M_{CG}$ may be less than or equal to $N_{CG}$ and, in some cases, an $M_{CG}$ value may be defined per cell group g, denoted as $M_{CGg}$.

The ML capability reported by the UE may correspond to configured cells or a subset of the configured cells that are activated for communication with the UE. The cells may have different numerologies (e.g., numerology 0 is associated with SCS=15 kHz and slot duration 1 ms, numerology 1 is associated with SCS=30 kHz and slot duration 0.5 ms, etc.).

According to certain aspects of the present disclosure, the UE may not report $N_{CG}$ under certain conditions. For example, the UE may not report $N_{CGg}$ when the maximum supported number of cells in a cell group for a UE fails to exceed a threshold value (e.g., number of supported cells by the UE). In such cases, the UE and the network may assume $N_{CGg}$ is equal to a default value, such as the maximum supported number of cells by the UE.

Reported UE ML capability may correspond to an equivalent number of cells that the UE is able to independently handle in one cell group for ML functions. The equivalent number may or may not be same as the number of cells in the cell group for which the UE ML capability is reported. In some cases, the equivalent number of cells that UE can independently handle in one cell group for ML functions may be larger than the equivalent number.

According to certain aspects of the present disclosure, the network may indicate an actual ML capability, $M_{CG}$, per cell group to the UE based on per cell group capability (i.e., $N_{CGg}$ for a cell group g), as illustrated in 506. For a cell group g, this number can be denoted $M_{CGg}$. Similar to $N_{CGg}$, $M_{CGg}$ may be understood as the equivalent number of cells in cell group g for which the UE is required to independently handle. In some cases, there may be some restriction relationship between $M_{CGg}$ and $N_{CGg}$. For example, $M_{CGg}$ may be less than or equal to $N_{CGg}$ for each cell group g ($M_{CGg} \leq N_{CGg}$).

In some cases, UE ML capability per cell group may also be subject to a single cell limit ($L_{SC,T}$). In some cases, the total number of cells across numerology within cell group g may less than or equal to $M_{CGg}$. In such cases, the actual number of computational complexity or memory usage for any given cell within a cell group g that the UE is expected to handle is $\leq L_{SC,T}$.

In other cases, the total number of cells across numerology within cell group g is greater than $M_{CGg}$. In such cases, the UE ML capability for a cell group g may be split across all cells within the cell group g.

The call flow diagram 600 of FIG. 6 illustrates an example of splitting the UE ML capability across cells within cell group g. At 602, a UE 104 determines an overall ML capability number $N_{CGg}$ across all cells of cell group g, where the UE ML capability is split across cells the group.

At 604, the UE determines a limit $L_{SC,T}$ of the UE to support ML functions within any given (single) cell of the group. At 606, the UE transmits an indication of $N_{CGg}$ and $L_{SC,T}$ to the network (e.g., in the same or separate UE capability reports).

As illustrated, at 607, the network may determine an actual ML capability number $M_{CGg}$ for cell group g based on $N_{CGg}$. At 608, the network splits $M_{CGg}$ across cells of cell group g, for example, such that the computational complexity or memory usage for each cell is less than or equal to $L_{SC,T}$.

The splitting may be per cell to obtain the indicated capability for each cell (i.e., $M_{CGg,cell}$) at illustrated in FIG. 7. When the total number of cells across numerology within cell group g is less than or equal to $M_{CGg}$, the value range for each $M_{CGg,cell}$ may be between 0 and $M_{CGg}$. In one example, the $M_{CGg,cell}$ may be equal to 0.9. When there is only single cell configured, $M_{CGg,cell}$ could be equal to $M_{CGg}$.

In some cases, $M_{CGg,cell}$ could be equal to the $M_{CGg}$ divided by number of cells within cell group g. In some cases, a first value $M_{CGg,cell}$,M could be defined for master cell, and a second value $M_{CGg,cell}$,S could be defined for the secondary cell.

In general, the summation of the $M_{CGg,cell}$ should be less than or equal to $M_{CGg}$. In addition, the actual number of computational complexity or memory usage for any given cell within a cell group g that the UE is expected to handle may be less than or equal to a value determined as the lesser of the reported value of $L_{SC,T}$ and the reported value of adjusted for the ML capability allocated to that cell: min ($L_{sc,T}$, $M_{CGg,cell} \times L_{sc,T}$).

In some cases, when the total number of cells across numerology within cell group g is greater than $M_{CGg}$, the capability $M_{CGg}$ may be split per sets of cells with the same numerology ($\mu$) to obtain the indicated capability for each the set of cells with numerology $\mu$, $M_{CGg}$,$\mu$. A numerology is generally defined by a subcarrier spacing (SCS) and cyclic prefix (CP) length.

In some cases, $M_{CGg}$,$\mu$ may be proportional to the number of cells within cell group g with numerology $\mu$. For example, $M_{CGg}$,$\mu$ is one specific value with numerology $\mu$. Generally, the summation of the $M_{CGg}$,$\mu$ should be less than or equal to $M_{CGg}$. The actual number of computational complexity or memory usage for all cells within a cell group g with numerology p that the UE is expected to handle is less than or equal to $M_{CGg,\mu} \times L_{sc,T}$.

The actual number of computational complexity or memory usage for each cell within a cell group g that the UE is expected to handle is less than or equal to $min(L_{sc,T}, M_{CGg,\mu} \times L_{sc,T})$. For example, at subcarrier spacing (SCS) equal to 30 KHz, the $M_{CGg,30\ KHz}$ may be equal to 0.9, so the actual number of the computational complexity and memory usage for one cell with 30 KHz should be greater than 0.9 multiplied by $L_{SC,T}$.

In some cases, if the ML limit determined above is exceeded by a network ML model configuration, the UE may only handle ML operations up to the amount according to the limit determined during operations. As a result, any other ML models may be dropped by the UE. The UE may perform such dropping according to various dropping rules or algorithms.

For example, according to one dropping algorithm, the UE may drop ML models according to the following steps:
1) For cell group g if multiple cells are configured (e.g., if CA is configured) then,
2) For each cell i in the set of cells in cell group g with numerology y, then
3) For each ML model j within cell i
4) Add the total number of operations (e.g., computational complexity or memory usage) for ML mode j into a counter
5) Repeat steps 1-4 until the counter exceeds the limit determined above (per the call flow 600).

In some cases, the UE may only handle ML models that have been counted before this ML mode, j. Further, in some cases, the UE may stop counting if a limit is exceeded for any ML related metric (e.g., memory usage or computational complexity)

In some cases, simplifications may be implemented for counting and dropping ML models. In one example, the UE may only be expected to be configured with ML models that may exceed limits on a subset of cells. In one example, the subset may be a PCell in a master cell group or a SCell in a SCell group. In another example, the subset may be only the cells with low SCS, which may have higher priority than other SCS.

In some cases, the UE may not need to check the total limit for all cells in the cell group with the same numerology. In such cases, splitting may be performed for each set of cells having the same numerology to obtain the indicated ML capability for each the set of cells with numerology $\mu$. $M_{CGg},\mu$ may be guaranteed by the network if the other limit is satisfied.

Example Wireless Communication Devices

FIG. 8 illustrates example operations 800 for wireless communication by a UE. The operations 800 may be performed, for example, by a UE (e.g., such as a UE 104 of FIG. 1) to indicate a machine learning (ML) capability of the UE to support ML functions.

At 810, the UE generates a message that includes a first parameter indicating a capability of the UE to support machine learning (ML) functions across a group of cells.

At 820, the UE transmits the message to a network entity.

Figure 9:
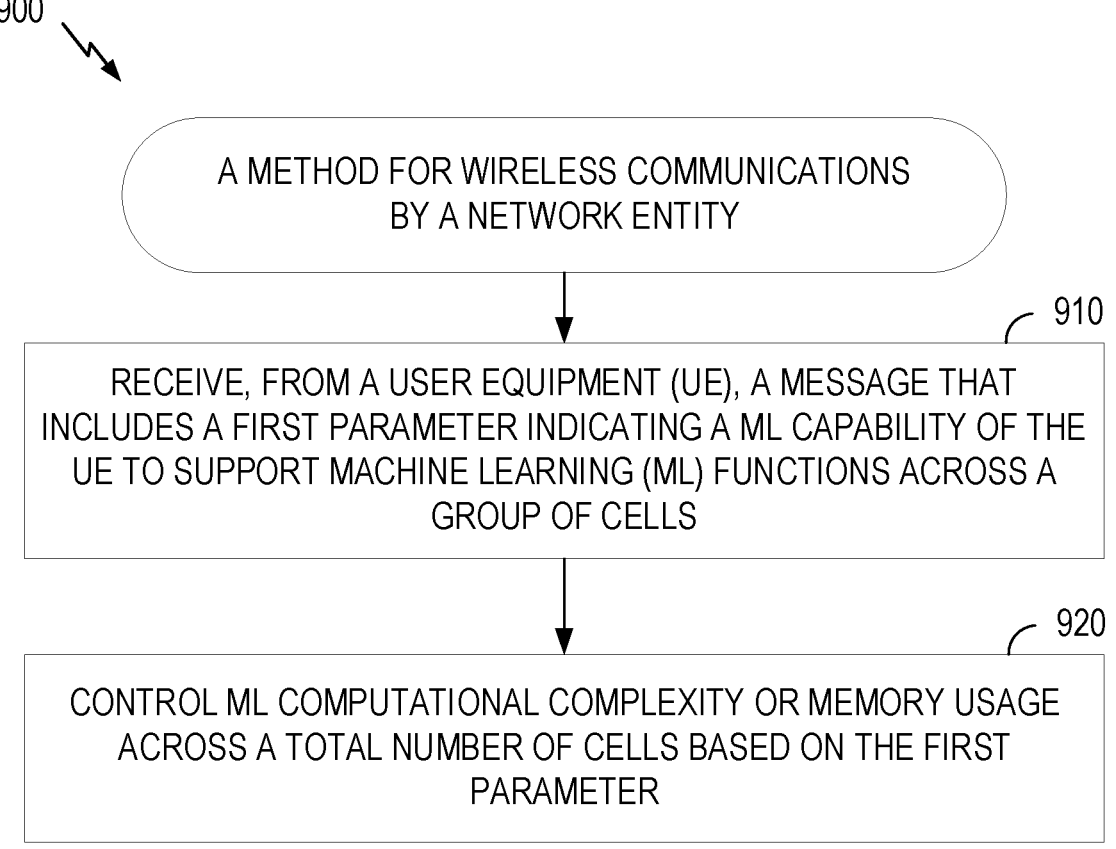
FIG. 9 illustrates example operations for wireless communications by a network entity, in accordance with some aspects of the present disclosure.

FIG. 9 illustrates example operations 900 for wireless communication by a network entity. The operations 900 may be performed, for example, by a base station (e.g., BS 102 of FIG. 1) to control ML computational complexity or memory usage.

At 910, the network entity receives, from a user equipment (UE), a message that includes a first parameter indicating a ML capability of the UE to support machine learning (ML) functions across a group of cells.

At 920, the network entity control ML computational complexity or memory usage across a total number of cells based on the first parameter.

Example Wireless Communication Devices

FIG. 10 depicts an example communications device 1000 that includes various components operable, configured, or adapted to perform operations for the techniques disclosed herein, such as the operations depicted and described with respect to FIG. 8. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 8, or other operations for performing the various techniques discussed herein for determine ML capability across a cell group.

In the depicted example, computer-readable medium/memory 1030 stores code 1031 for generating a message that includes a first parameter indicating a capability of the UE to support machine learning (ML) functions across a group of cells, and code 1032 for transmitting the message to a network entity.

In the depicted example, the one or more processors 1020 include circuitry configured to implement the code stored in the computer-readable medium/memory 1030, including circuitry 1021 for generating a message that includes a first parameter indicating a capability of the UE to support machine learning (ML) functions across a group of cells, and circuitry 1022 for transmitting the message to a network entity.

Various components of communications device 1000 may provide means for performing the methods described herein, including with respect to FIG. 8.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the user equipment 104 illustrated in FIG. 2 and/or transceiver 1008 and antenna 1010 of the communication device 1000 in FIG. 10.

In some examples, means for generating and/or transmitting may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including ML capability component 281).

Notably, FIG. 10 is an example, and many other examples and configurations of communication device 1000 are possible.

FIG. 11 depicts an example communications device 1100 that includes various components operable, configured, or adapted to perform operations for the techniques disclosed herein, such as the operations depicted and described with respect to FIG. 9. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 9, or other operations for performing the various techniques discussed herein for control ML complexity and/or memory usage across a cell group.

In the depicted example, computer-readable medium/memory 1130 stores code 1131 for receiving, from a user equipment (UE), a message that includes a first parameter indicating a ML capability of the UE to support machine learning (ML) functions across a group of cells, and code 1132 for controlling ML computational complexity or memory usage across a total number of cells based on the first parameter.

In the depicted example, the one or more processors 1120 include circuitry configured to implement the code stored in the computer-readable medium/memory 1130, including circuitry 1121 for receiving, from a user equipment (UE), a message that includes a first parameter indicating a ML capability of the UE to support machine learning (ML) functions across a group of cells, and circuitry 1122 for controlling ML computational complexity or memory usage across a total number of cells based on the first parameter.

Various components of communications device 1100 may provide means for performing the methods described herein, including with respect to FIG. 9.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for receiving and/or controlling may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including ML capability component 241).

Notably, FIG. 11 is an example, and many other examples and configurations of communication device 1100 are possible.

Example Clauses

Implementation examples are described in the following numbered clauses:

Clause 1: method for wireless communications by a user equipment (UE), comprising generating a message that includes a first parameter indicating a capability of the UE to support machine learning (ML) functions across a group of cells, and transmitting the message to a network entity.

Clause 2: The method of clause 1, wherein the first parameter indicates a number of cells for which the UE is able to support ML functions.

Clause 3: The method of any one of clauses 1 through 2, wherein the group of cells comprise at least one of cells configured for the UE or activated cells among the cells configured for the UE.

Clause 4: The method of any one of clauses 1 through 3, wherein cells within the group of cells have different numerologies.

Clause 5: The method of any one of clauses 1 through 4, wherein the UE is configured to transmit the first parameter indicating the capability of the UE to support ML functions across the group of cells only when at least one condition is met.

Clause 6: The method of clause 5, wherein the at least one condition comprises a maximum supported number of cells in the cell group is less than or equal to a threshold value.

Clause 7: The method of any one of clauses 1 through 6, further comprising receiving, from the network entity, an indication of an actual ML capability per cell group.

Clause 8: The method of clause 7, wherein the actual ML capability per cell group indicates a number of cells for which the UE is expected to support ML functions.

Clause 9: The method of any one of clauses 1 through 8, wherein the message also includes a second parameter indicating a ML capability of the UE to support ML functions within a single cell.

Clause 10: The method of clause 9, wherein if ML computational complexity or memory usage across a total number of cells within the cell group exceeds ML capability of the UE across all cells, as indicated by the first parameter, the ML capability of the UE is split across cells in the group of cells.

Clause 11: The method of any one of clauses 9 through 10, wherein the ML capability of the UE is split across cells in the group of cells, such that each cell in the group is allocated a portion of the ML capability of the UE within a range.

Clause 12: The method of any one of clauses 9 through 11, wherein the ML capability of the UE is split across cells in the group of cells, such that a portion of the ML capability allocated to any given cell depends, at least in part, on whether the cell is a master cell or a secondary cell.

Clause 13: The method of any one of clauses 9 through 12, wherein the ML capability of the UE is split across cells in the group of cells, such that a portion of the ML capability allocated to any given cell depends, at least in part, on a numerology of that cell.

Clause 14: The method of any one of clauses 9 through 113, wherein one or more ML models are dropped to ensure that, after the ML capability of the UE is split across cells in the group of cells, the ML computational complexity or memory usage across all cells does not exceed the ML capability of the UE, as indicated by the first parameter or that the ML computational complexity or memory usage in any one cell does not exceed the ML capability of the UE, as indicated by the second parameter.

Clause 15: The method of any one of clauses 9 through 14, wherein the UE is configured to allow ML computational complexity or memory usage in one or more cells to exceed the capability of the UE, as indicated by the second parameter.

Clause 16: A method for wireless communications by a network entity, comprising receiving, from a user equipment (UE), a message that includes a first parameter indicating a ML capability of the UE to support machine learning (ML) functions across a group of cells, and controlling ML computational complexity or memory usage across a total number of cells based on the first parameter.

Clause 17: The method of clause 16, wherein the first parameter indicates a number of cells for which the UE is able to support ML functions.

Clause 18: The method of any one of clauses 16 through 17, wherein the group of cells comprise at least one of cells configured for the UE or activated cells among the cells configured for the UE.

Clause 19: The method of any one of clauses 16 through 19, wherein cells within the group of cells have different numerologies.

Clause 20: The method of any one of clauses 16 through 20, wherein the UE is configured to transmit the first parameter indicating the ML capability of the UE to support ML functions across the group of cells only when at least one condition is met.

Clause 21: The method of clause 20, wherein the at least one condition comprises a maximum supported number of cells in the cell group is less than or equal to a threshold value.

Clause 22: The method of clause 21, wherein the network entity assumes a default value for the parameter if the UE does not transmit the first parameter.

Clause 23: The method of any one of clauses 16 through 22, further comprising transmitting, to the UE, an indication of an actual ML capability per cell group.

Clause 24: The method of clause 23, wherein the actual ML capability per cell group indicates a number of cells for which the UE is expected to support ML functions.

Clause 25: The method of any one of clauses 16 through 24, wherein the message also includes a second parameter indicating a capability of the UE to support ML functions within a single cell.

Clause 26: The method of clause 25, wherein, if ML computational complexity or memory usage across the total number of cells within the cell group exceeds the ML capability of the UE across all cells, as indicated by the first parameter, the ML capability of the UE is split across cells in the group of cells.

Clause 27: The method of any one of clauses 25 through 26, wherein ML capability of the UE is split across cells in the group of cells, such that each cell in the group is allocated a portion of the ML capability of the UE within a range.

Clause 28: The method of any one of clauses 25 through 27, wherein the ML capability of the UE is split across cells in the group of cells, such that a portion of the ML capability allocated to any given cell depends, at least in part, on whether the cell is a master cell or a secondary cell.

Clause 29: The method of any one of clauses 25 through 28, wherein the ML capability of the UE is split across cells in the group of cells, such that a portion of the ML capability allocated to any given cell depends, at least in part, on a numerology of that cell.

Clause 30: The method of any one of clauses 25 through 29, wherein one or more ML models are dropped to ensure that, after the ML capability of the UE is split across cells in the group of cells, the ML computational complexity or memory usage across all cells does not exceed the ML capability of the UE, as indicated by the first parameter or that the ML computational complexity or memory usage in any one cell does not exceed the ML capability of the UE, as indicated by the second parameter.

Clause 31: The method of any one of clauses 25 through 30, wherein the UE is configured to allow ML computational complexity or memory usage in one or more cells to exceed the capability of the UE, as indicated by the second parameter.

Clause 32: An apparatus, comprising: a memory comprising executable instructions; one or more processors configured to execute the executable instructions and cause the apparatus to perform a method in accordance with any one of Clauses 1-31.

Clause 33: An apparatus, comprising means for performing a method in accordance with any one of Clauses 1-31.

Clause 34: A non-transitory computer-readable medium comprising executable instructions that, when executed by one or more processors of an apparatus, cause the apparatus to perform a method in accordance with any one of Clauses 1-31.

Clause 35: A computer program product embodied on a computer-readable storage medium comprising code for performing a method in accordance with any one of Clauses 1-31.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of defining user equipment (UE) capability for machine learning (ML) support across a network cell group in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:

generating a message, wherein:

when at least one condition is met, the message includes a first parameter indicating a first machine learning (ML) capability of the UE to support ML functions across a group of cells, wherein the first ML capability comprises a number of cells for which the UE is able to support the ML functions; and the message further includes a second parameter indicating a second ML capability of the UE to support ML functions within a single cell;

transmitting the message to a network entity; and dropping one or more ML models to ensure that, after the first ML capability of the UE is split across cells in the group of cells, ML computational complexity or memory usage across all the cells of the group of cells does not exceed the first ML capability of the UE, as indicated by the first parameter or that the ML computational complexity or the memory usage in any one cell in the group of cells does not exceed the second ML capability of the UE, as indicated by the second parameter.

2. The method of claim 1, wherein the group of cells comprise at least one of:
cells configured for the UE; or
activated cells among cells configured for the UE.

3. The method of claim 1, wherein cells within the group of cells are associated with different numerologies.

4. The method of claim 1, wherein the at least one condition is that a maximum supported number of cells in the group of cells is less than or equal to a threshold value.

5. The method of claim 1, further comprising receiving, from the network entity, an indication of an actual ML capability per cell group.

6. The method of claim 5, wherein the actual ML capability per cell group indicates a number of cells for which the UE is expected to support the ML functions.

7. The method of claim 1, wherein, if the ML computational complexity or the memory usage across a total number of cells within the group of cells exceeds the first ML capability of the UE across all the cells in the group of cells, as indicated by the first parameter, the first ML capability of the UE is split across all the cells in the group of cells.

8. The method of claim 1, wherein the first ML capability of the UE is split across cells in the group of cells, such that each cell in the group of cells is allocated a portion of the first ML capability of the UE within a range.

9. The method of claim 1, wherein the first ML capability of the UE is split across the cells in the group of cells, such that a portion of the first ML capability of the UE allocated to any given cell depends, at least in part, on whether that cell is a master cell or a secondary cell.

10. The method of claim 1, wherein the first ML capability of the UE is split across the cells in the group of cells, such that a portion of the first ML capability of the UE allocated to any given cell depends, at least in part, on a numerology of that cell.

11. The method of claim 1, wherein the UE is configured to allow the ML computational complexity or the memory usage in one or more cells in the group of cells to exceed the second ML capability of the UE, as indicated by the second parameter.

12. A method for wireless communications by a network entity, comprising:
receiving, from a user equipment (UE), a message, wherein:
when at least one condition is met, the message includes a first parameter indicating a first ML capability of the UE to support ML functions across a group of cells, wherein the first ML capability comprises a number of cells for which the UE is able to support the ML functions; and
the message further includes a second parameter indicating a second ML capability of the UE to support the ML functions within a single cell; and
controlling ML computational complexity or memory usage across a total number of cells based on the first parameter, wherein one or more ML models are dropped to ensure that, after the first ML capability of the UE is split across the cells in the group of cells, the ML computational complexity or memory usage across all cells in the group of cells does not exceed the first ML capability of the UE, as indicated by the first parameter or that the ML computational complexity or the memory usage in any one cell in the group of cells does not exceed the second ML capability of the UE, as indicated by the second parameter.

13. The method of claim 12, wherein the group of cells comprise at least one of:
cells configured for the UE; or
activated cells among cells configured for the UE.

14. The method of claim 12, wherein cells within the group of cells are associated with different numerologies.

15. The method of claim 12, wherein the at least one condition is that a maximum supported number of cells in the group of cells is less than or equal to a threshold value.

16. The method of claim 15, wherein the network entity assumes a default value for the first parameter the first parameter is not included in the message.

17. The method of claim 12, further comprising transmitting, to the UE, an indication of an actual ML capability per cell group.

18. The method of claim 17, wherein the actual ML capability per cell group indicates a number of cells for which the UE is expected to support the ML functions.

19. The method of claim 12, wherein, if the ML computational complexity or the memory usage across the total number of cells within the group of cells exceeds the first ML capability of the UE across all the cells in the group of cells, as indicated by the first parameter, the first ML capability of the UE is split across all the cells in the group of cells.

20. The method of claim 12, wherein first ML capability of the UE is split across the cells in the group of cells, such that each cell in the group of cells is allocated a portion of the first ML capability of the UE within a range.

21. The method of claim 12, wherein the first ML capability of the UE is split across the cells in the group of cells, such that a portion of the first ML capability allocated to any given cell depends, at least in part, on whether that cell is a master cell or a secondary cell.

22. An apparatus for wireless communications by a user equipment (UE), comprising:
one or more processors configured to execute instructions stored on one or more memories to cause the UE to:
generate a message, wherein:
when at least one condition is met, the message includes a first parameter indicating a first machine learning (ML) capability of the UE to support ML functions across a group of cells, wherein the first ML capability comprises a number of cells for which the UE is able to support the ML functions; and
the message further includes a second parameter indicating a second ML capability of the UE to support the ML functions within a single cell;
transmit the message to a network entity; and
drop one or more ML models to ensure that, after the first ML capability of the UE is split across cells in the group of cells, ML computational complexity or memory usage across all the cells in the group of cells does not exceed the first ML capability of the UE, as indicated by the first parameter or that the ML computational complexity or the memory usage in any one cell in the group of cells does not exceed the second ML capability of the UE, as indicated by the second parameter.

23. An apparatus for wireless communications by a network entity, comprising:
one or more processors configured to execute instructions stored on one or more memories to cause the network entity to:

receive, from a user equipment (UE), a message, wherein:

when at least one condition is met, the message includes a first parameter indicating a first machine learning (ML) capability of the UE to support ML functions across a group of cells, wherein the first ML capability comprises a number of cells for which the UE is able to support the ML functions; and the message further includes a second parameter indicating a second ML capability of the UE to support ML functions within a single cell;

control ML computational complexity or memory usage across a total number of cells based on the first parameter, wherein one or more ML models are dropped to ensure that, after the first ML capability of the UE is split across cells in the group of cells, the ML computational complexity or the memory usage across all the cells in the group of cells does not exceed the first ML capability of the UE, as indicated by the first parameter or that the ML computational complexity or the memory usage in any one cell in the group of cells does not exceed the second ML capability of the UE, as indicated by the second parameter.

* * * * *